US011416998B2

(12) United States Patent
Bleyer et al.

(10) Patent No.: US 11,416,998 B2
(45) Date of Patent: Aug. 16, 2022

(54) PIXEL CLASSIFICATION TO REDUCE DEPTH-ESTIMATION ERROR

(71) Applicant: Microsoft Technology Licensing, LLC, Redmond, WA (US)

(72) Inventors: Michael Bleyer, Seattle, WA (US); Yuri Pekelny, Seattle, WA (US); Raymond Kirk Price, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 100 days.

(21) Appl. No.: 16/526,305

(22) Filed: Jul. 30, 2019

(65) Prior Publication Data

US 2021/0035303 A1    Feb. 4, 2021

(51) Int. Cl.
*G06K 9/00* (2022.01)
*G06T 7/11* (2017.01)
*G06K 9/62* (2022.01)

(52) U.S. Cl.
CPC .............. *G06T 7/11* (2017.01); *G06K 9/6267* (2013.01); *G06T 2207/20084* (2013.01)

(58) Field of Classification Search
CPC . G06T 7/50; G06T 7/579; G06T 2207/20076; G06K 9/03; G06K 9/6269
See application file for complete search history.

(56) References Cited

U.S. PATENT DOCUMENTS 8,642,349 B1 * 2/2014 Yeatman .......... G01N 33/57419
436/86

| 9,514,537 | B2 * | 12/2016 | Bernal ..................... G06T 7/11 |
| 9,747,519 | B2 * | 8/2017 | Schoenberg ............. G06K 9/46 |
| 9,747,694 | B2 * | 8/2017 | Chung .................... G06T 5/006 |
| 9,898,856 | B2 * | 2/2018 | Yang ....................... G06T 5/006 |
| 9,965,865 | B1 * | 5/2018 | Agrawal ............ G06K 9/00234 |

(Continued)

FOREIGN PATENT DOCUMENTS

| CN | 108829826 A | 11/2018 |
| CN | 109978786 A | 7/2019 |

(Continued)

OTHER PUBLICATIONS

Eppel, Sagi, "Setting an attention region for convolutional neural networks using region selective features, for recognition of materials within glass vessels", In Journal of the Computing Research Repository, Aug. 2017, 20 Pages.

(Continued)

*Primary Examiner* — Oneal R Mistry
(74) *Attorney, Agent, or Firm* — Alleman Hall Creasman & Tuttle LLP

(57) ABSTRACT

A method to process a contributing digital image of a subject in an image-processing computer. The contributing digital image is received in a depth-resolving machine configured to furnish a depth image based at least in part on the contributing digital image. The contributing digital image is also received in a classification machine previously trained to classify a pixel of the contributing digital image as liable to corrupt a depth value of a corresponding pixel of the depth image. A repair value is computed for the depth value of the corresponding pixel of the depth image, which is then corrected based on the repair value and returned to the calling process.

20 Claims, 9 Drawing Sheets

(56) References Cited

U.S. PATENT DOCUMENTS

| | | | |
|---|---|---|---|
| 10,290,107 | B1 | 5/2019 | Casas et al. |
| 10,839,535 | B2* | 11/2020 | Javidnia .............. G06K 9/6215 |
| 2005/0058337 | A1* | 3/2005 | Fujimura ................ G06K 9/32 |
| | | | 382/159 |
| 2005/0100192 | A1* | 5/2005 | Fujimura ........... G06K 9/00805 |
| | | | 382/103 |
| 2012/0269384 | A1* | 10/2012 | Jones ................. G06K 9/00201 |
| | | | 382/103 |
| 2015/0015569 | A1* | 1/2015 | Jung .................... G06T 15/005 |
| | | | 345/419 |
| 2015/0269740 | A1* | 9/2015 | Mazurenko ............... G06T 7/11 |
| | | | 382/173 |
| 2016/0210521 | A1* | 7/2016 | Traxler ............. G06K 9/00805 |
| 2016/0247284 | A1* | 8/2016 | Zaytsev ............ G06K 9/00973 |
| 2017/0098312 | A1* | 4/2017 | Souchard ............. H04N 13/221 |
| 2017/0127048 | A1* | 5/2017 | Nobayashi ........... H04N 13/128 |
| 2017/0178332 | A1 | 6/2017 | Lindner et al. |
| 2017/0223334 | A1* | 8/2017 | Nobayashi .............. G06T 7/571 |
| 2017/0236287 | A1 | 8/2017 | Shen et al. |
| 2017/0270664 | A1* | 9/2017 | Hoogi .................. A61B 6/5217 |
| 2018/0033145 | A1* | 2/2018 | Schoenberg ............. G06T 5/40 |
| 2018/0057852 | A1* | 3/2018 | Takats .................... C12Q 1/025 |
| 2018/0075315 | A1* | 3/2018 | Gu ............................ G06T 5/50 |
| 2018/0189611 | A1* | 7/2018 | Dal Mutto ......... G06K 9/00201 |
| 2018/0336683 | A1 | 11/2018 | Feng et al. |
| 2020/0286263 | A1* | 9/2020 | Li .............................. G06T 9/00 |
| 2020/0327685 | A1* | 10/2020 | Ren ...................... G06K 9/6267 |
| 2020/0380769 | A1* | 12/2020 | Liu ............................ G06F 3/01 |
| 2021/0352323 | A1* | 11/2021 | Sugio ..................... G06T 9/001 |
| 2021/0406618 | A1* | 12/2021 | Park ..................... G06V 10/803 |

FOREIGN PATENT DOCUMENTS

| | | |
|---|---|---|
| JP | 2019016275 A | 1/2019 |
| WO | 2017087088 A1 | 5/2017 |

OTHER PUBLICATIONS

Feris, Rogerio Schmidt., "Detection and Modeling of Depth Discontinuities with Lighting and Viewpoint Variation", In thesis of University of California, Sep. 2006, 165 Pages.

Kim, et al., "RetroDepth: 3D Silhouette Sensing for High Precision Input on and Above Physical Surfaces", In the Proceedings of the SIGCHI Conference on Human Factors in Computing Systems, Apr. 26, 2014, pp. 1377-1386.

Le, James, "How to do Semantic Segmentation using Deep learning", Retrieved from: https://medium.com/nanonets/how-to-do-image-segmentation-using-deep-learning-c673cc5862ef, May 3, 2018, 11 Pages.

Schwrtz, et al., "Recognizing Material Properties from Images", In Journal of Computing Research Repository, Jan. 9, 2018, 14 Pages.

Seong, et al., "Vision-Based Safety Vest Detection in a Construction Scene", In the Proceedings of 34th International Symposium on Automation and Robotics in Construction, Jul. 2017, 06 Pages.

Vertens, et al., "SMSnet: Semantic Motion Segmentation using Deep Convolutional Neural Networks", In Proceedings of IEEE/RSJ International Conference on Intelligent Robots and Systems, Sep. 24, 2017, 08 Pages.

Marco et al., "DeepToF: Off-the-Shelf Real-Time Correction of Multipath Interference in Time-of-Flight Imaging", In Journal of arXiv:1805.09305v1, May 23, 2018, pp. 1-12.

"International Search Report and Written Opinion Issued in PCT Application No. PCT/US20/036882", dated Oct. 6, 2020, 12 Pages.

* cited by examiner

PIXEL CLASSIFICATION TO REDUCE DEPTH-ESTIMATION ERROR

BACKGROUND

Driven by advances in optical-sensor technology, digital imaging continues to expand into new application areas and device implementations. For example, low-cost 3D digital cameras are now used in various consumer-electronic devices. A 3D digital camera may operate according to stereo-optical, structured-light, or time-of-flight (ToF) principles and may support various functions beyond basic imaging. In a computer or video-game system, for example, image output from a 3D digital camera may be used to recognize user gestures that control the system or provide other input. Naturally, the reliability of sophisticated input modalities such as gesture recognition depends upon the fidelity of the underlying 3D imaging.

SUMMARY

One aspect of this disclosure relates to a method to process a contributing digital image of a subject in an image-processing computer. In this method, the contributing digital image is received in a depth-resolving system configured to furnish a depth image based at least in part on the contributing digital image. The contributing digital image is also received in a classification engine previously trained to classify a pixel of the contributing digital image as liable to corrupt a depth value of a corresponding pixel of the depth image. A repair value is computed for the depth value of the corresponding pixel of the depth image, which is then corrected based on the repair value and returned to the calling process.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The claimed subject matter is not limited to implementations that solve any or all disadvantages noted in any part of this disclosure.

DETAILED DESCRIPTION

Figure 1:
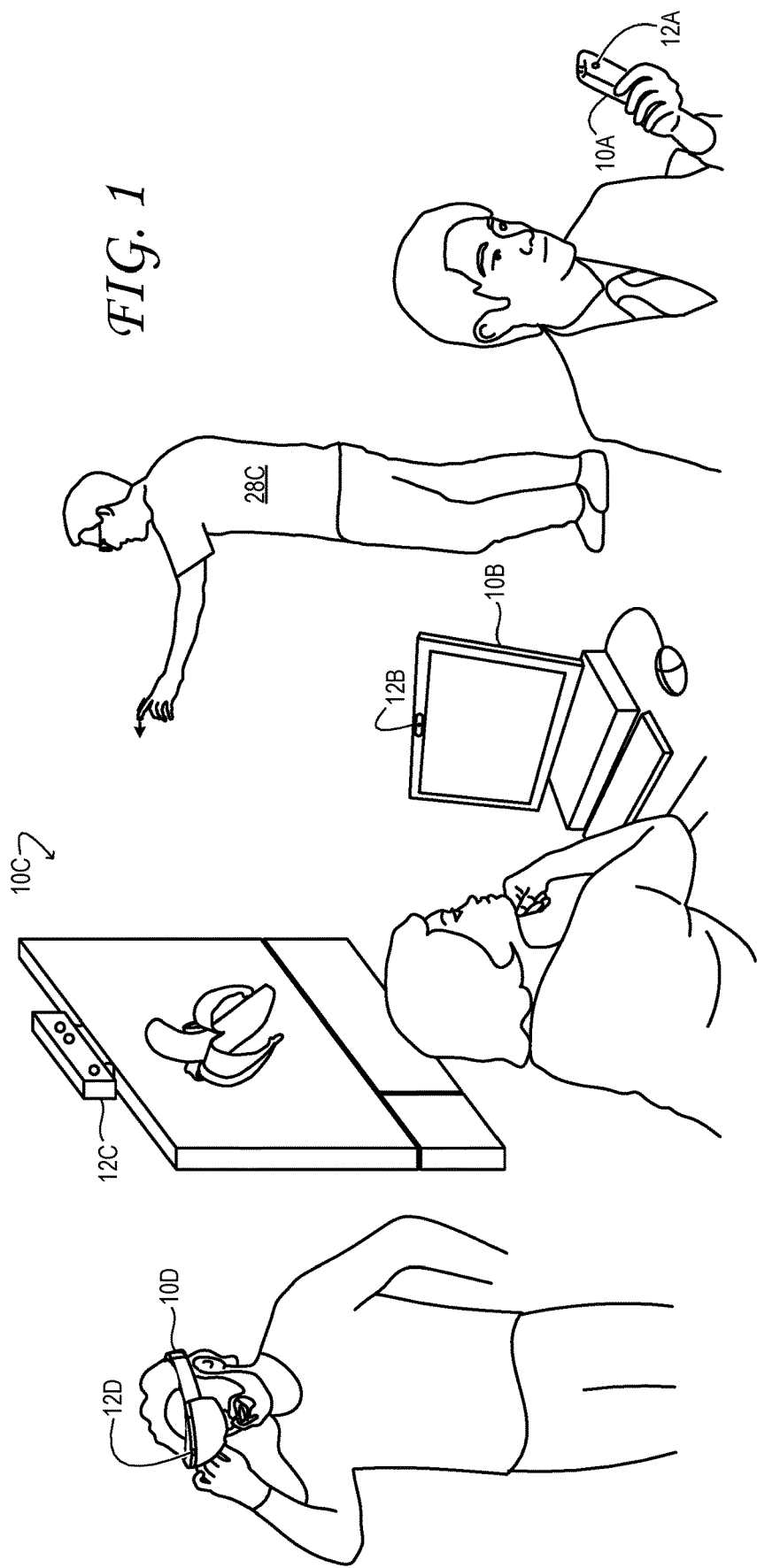
FIG. 1 shows aspects of example electronic devices having embedded or peripheral 3D digital cameras.

Accurate depth estimation improves the reliability of various classification tasks that may be enacted on a digital image of a subject. Classification may be used to label the pixels of a digital image that correspond to a human being, to a particular human being, or to specific anatomical parts of a human being, for instance. Some subjects are amenable to accurate depth estimation and downstream classification, but other subjects are much less amenable. Depth estimation may be inaccurate, for example, when the subject is moving rapidly on the timescale of 3D image acquisition. In other examples, depth estimation may be inaccurate due to certain optical properties of the subject. Semitransparent subjects such as glass windows often give rise to inaccurate depth values, as do retroreflective and specularly reflective subjects. Naturally, when the topology of any portion of a subject is inaccurately resolved, downstream classification on that portion of the subject becomes unreliable.

This disclosure provides improved depth imaging via an upstream classification procedure that labels segments of a digital image that exhibit one or more problem conditions, including but not limited the problem conditions noted above. Once labeled, pixels affected by a problem condition may be masked or repaired before downstream classification is attempted. In implementations in which a digital image carrying depth information is derived from one or more contributing digital images, the labeling of problem segments may be enacted on the contributing digital images, which include the full basis of information on which the labeling determination can be made. In some nonlimiting examples, pixel classification is enacted via an artificial neural network previously trained to recognize problem conditions, such as those enumerated above.

This disclosure will now be presented by way of example and with reference to the drawing figures listed above. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

FIG. 1 shows aspects of four different electronic devices 10. Each electronic device is associated with an imaging system that includes a 3D digital camera 12, or 'depth camera'. Electronic device 10A is a smartphone with an integrated, world-facing 3D digital camera 12A. Electronic device 10B is a personal computer with an integrated, user-facing 3D web camera 12B. Electronic device 10C is a video game system with a peripheral 3D digital camera 12C. Electronic device 10D is a virtual-reality headset with an integrated, world-facing 3D camera 12D. It will be noted that an electronic device having a world-facing 3D digital camera may also include a user-facing 3D digital camera, and vice versa. The description herein is applicable to these and other imaging systems, in these and other device contexts.

As evident based on the range of examples in FIG. 1, 3D digital cameras 12 may differ from one implementation to another. 3D digital cameras may also differ with respect to the depth-sensing technologies they employ. A stereo-vision camera, for example, is configured to acquire right and left stereo images of a subject, which, when co-registered, reveal a depth-dependent positional disparity between corresponding pixels of the images. The stereo-vision approach can be extended to imaging systems that acquire three or more contributing images of a subject from different vantage points and reconstruct the subject's topology based on the resolved disparities. A structured-light camera, by comparison, projects structured illumination onto an imaged surface of a subject. The structured illumination may comprise numerous discrete features (e.g., lines or dots), which are formed by directing active illumination (e.g., infrared light) onto a subject. The structured-light camera images the discrete features reflected back from the subject, and, based on the depth-dependent spacing between features, reconstructs the 3D topography of the subject. Still other 3D digital cameras operate according to the time-of-flight (ToF) principle, where distance to a point on a surface of a subject is computed based on the length of the time interval in which light emitted by the camera travels out to that point and then back to the camera. A ToF camera measures this interval for many points on the subject, creating a 3D digital image in which each depth coordinate is proportional to the measured interval.

Figure 2:
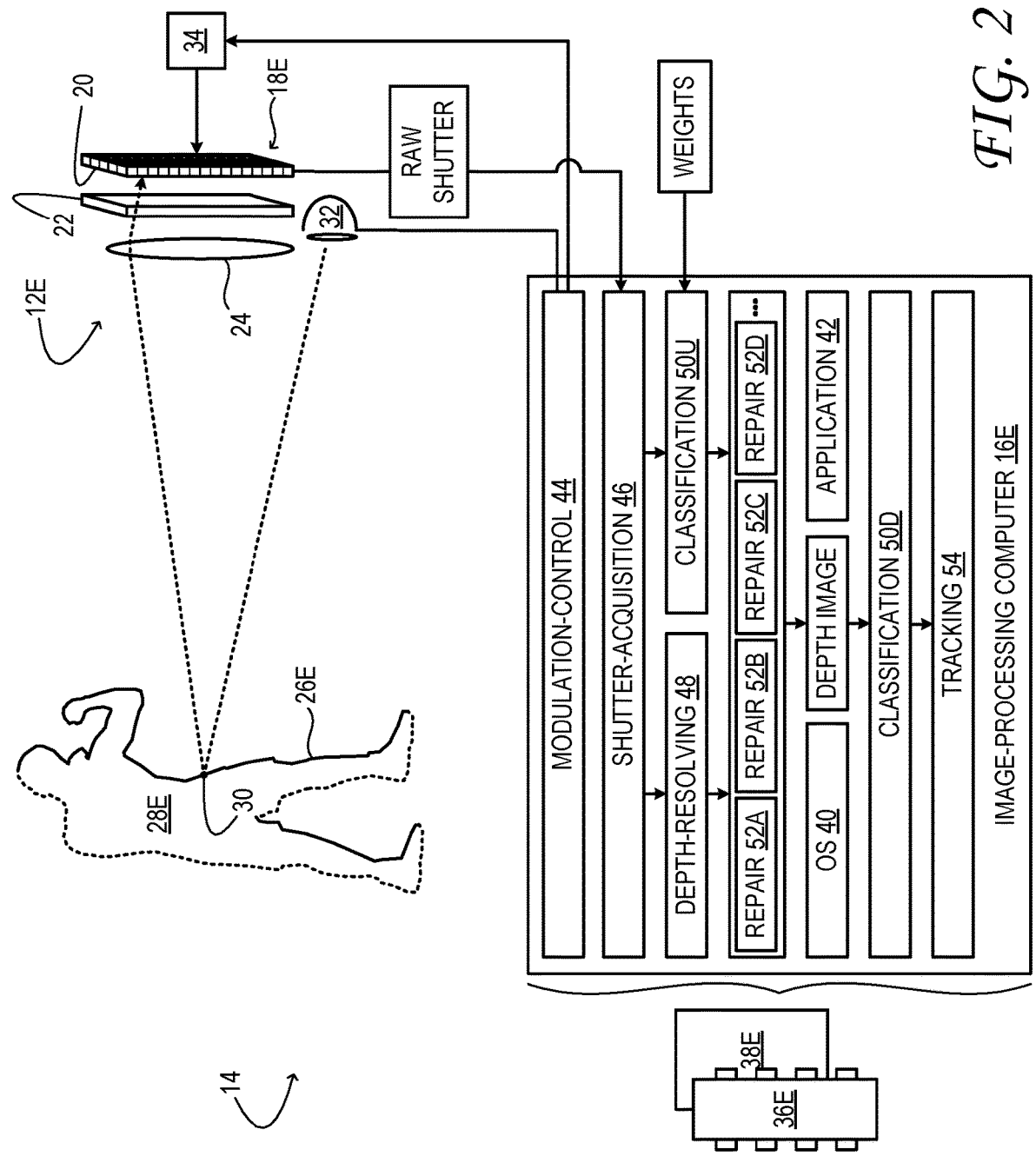
FIG. 2 shows aspects of example active illumination aging systems including 3D digital cameras.

FIG. 2 shows aspects of an example imaging system 14 including a ToF camera 12E and an image-processing computer 16E. The ToF camera includes a sensor array 18E comprising plural sensor elements 20, a wavelength filter 22, and an objective lens system 24. The objective lens system is configured to focus an image of at least one surface 26E of subject 28E onto the sensor array. The image-processing computer is configured to gather and process data from the various sensor elements and thereby construct one or more digital images of the subject. A digital image may be represented as a numeric array with a value $S_j$ provided for each of a set of pixels $(X, Y)_j$. In the example of FIG. 2, the X, Y position of each pixel of a digital image is mapped to an associated element 20 of sensor array 18E, and, via objective lens system 24, to a corresponding locus 30 of surface 26E. In some implementations, the mapping of image pixels to sensor elements may be a 1:1 mapping, but other mappings may be used as well, such as 1:4, 4:1, and others. In some implementations, ToF camera 12E may be configured to acquire a time-resolved sequence of digital images of the subject—i.e., video.

The dimensionality of each $S_j$ value of a digital image is not particularly limited. In some examples, $S_j$ may be a real- or integer-valued scalar that specifies the brightness of pixel $(X, Y)_j$. In some examples, $S_j$ may be a vector of real or integer values that specifies the color of pixel $(X, Y)_j$ using scalar component values for red, green, and blue color channels, for instance. In some examples, $S_j$ may include a complex value $a+b\sqrt{-1}$, where a and b are integers or real numbers. As described in greater detail below, a complex value $S_j$ may be used to represent the signal response of the sensor elements of a ToF camera that employs continuous-wave (CW) modulation and phase estimation to resolve radial distance. Such a camera is referred to herein as a 'CW-ToF camera'.

Continuing now in FIG. 2, to enact phase-based ToF imaging, ToF camera 12E includes a modulated light emitter 32 and a sensor array 18E with a modulated electronic shutter 34. The light emitter may be a near-infrared light-emitting diode (LED) or laser, for example, and the sensor array may be a high-resolution array of complementary metal-oxide semiconductor (CMOS) sensor elements 20. Accordingly, the sensor array is configured to image light from the light emitter that reflects off surface 26E and back to the camera. Other ToF cameras may include different optical, light-emitter and/or sensor-array variants—a charge-coupled device (CCD) sensor array, a microlens objective array, etc.

Electronic shutter 34 may take the form of a controlled voltage bias applied concurrently to certain electrode structures of the various sensor elements 20 of sensor array 18E. In some examples, the electrode structures receiving the controlled voltage bias may include current collectors that, depending on the level of the voltage bias, cause photoelectrons created within the sensor elements to drift to the current collectors and be measured as current. In some examples, the electrode structures receiving the controlled voltage bias may include gates that, depending on the level of the voltage bias, encourage or discourage the photoelectrons to drift towards the current collectors.

Image-processing computer 16E includes a logic system 36E and, operatively coupled to the logic system, a computer-memory system 38E. The computer-memory system may hold data, such as digital-image data, in addition to instructions that, when executed by the logic system, cause the logic system to undertake various acts. For example, the instructions may cause the logic system to execute an operating system (OS) 40, launch one or more applications 42, and/or instantiate one or more machines or engines as described hereinafter. In the example shown in FIG. 2, instructions held in the computer-memory system cause the logic system to instantiate a modulation-control engine 44, a shutter-acquisition engine 46, a depth-resolving machine 48, an upstream classification machine 50U, a downstream classification machine 50D, repair engines 52A-D, and a tracking engine 54.

Modulation-control engine 44 is configured to synchronously modulate light emitter 32 of ToF camera 12E and electronic shutter 34 of sensor array 18E. In some examples, the light emitter and the electronic shutter are modulated at one or more predetermined frequencies, with a predetermined, angular phase offset $\varphi'$ controlling the retardance of the electronic-shutter modulation relative to the light-emitter modulation. In some examples, 'modulation', as used herein, refers to a sinusoidal or digitized quasisinusoidal waveform, which simplifies analysis. This feature is not strictly necessary, however.

As noted above, sensor array 18E images the component of the reflected light that lags the emitter modulation by each of a series of predetermined phase offsets $\varphi'$. Shutter-acquisition engine 46 is configured to interrogate the sensor array to retrieve a resulting signal value $S_j$ from each sensor element 20. One digital image captured in this manner is called a 'raw shutter.' A raw shutter may be represented as a numeric array with a $\varphi'$-specific real intensity value $S_j$ provided for each sensor element and associated with coordinates $(X, Y)_j$ that specify the position of that sensor element in the sensor array.

A depth-resolving system comprising depth-resolving machine 48 is configured to furnish a derived digital image of subject 28E based on one or more contributing digital images of the subject. For instance, from three or more consecutive raw shutters acquired at three or more different phase offsets $\varphi'$, the depth-resolving machine may construct a 'phase image' that reveals the actual phase lag $\varphi$ of the light reflected back to each sensor element. A phase image is a numeric array with $\varphi_j$ specified for each sensor element and associated with coordinates $(X, Y)_j$ that specify the position of that sensor element in the sensor array. In some implementations, each signal value $S_j$ is a complex number $a+b\sqrt{-1}$, where a is the signal component in phase with the emitter modulation, and b is the signal component that lags the emitter modulation by 90°. In this context, the complex signal value $S_j$ is related to modulus $\|S_j\|$ and phase lag $\varphi$ by $$S_j = \|S_j\| e^{-i\varphi} \qquad (1)$$

In implementations in which the phase-independent reflectance of the subject is also of interest, a given phase image may be processed by replacing each complex signal value $S_j$ by its modulus, or by the square of its modulus. An image of that kind is referred to herein as an 'active-brightness' image.

Using data from a single phase image or set of component raw shutters, it is possible to conditionally estimate the radial distance $Z_j$ between the ToF camera and the surface point imaged at each sensor element j. More particularly, it is possible to solve for the depth using $$(\varphi/4\pi)+(N/2)=(Z_jf/c), \qquad (2)$$

where c is the velocity of light, f is the modulation frequency, and N is a non-negative integer.

The solution above is unique when the entire range of depth values $Z_j$ is no larger than half of the distance traveled by light in one modulation period, $c/(2f)$, in which case N is a constant. Otherwise, the solution is underdetermined and periodic. In particular, surface points at depths that differ by any integer multiple of $c/(2f)$ are observed at the same phase lag $\varphi$. A derived digital image resolved only to that degree—e.g., data from a single phase image or corresponding triad of raw shutters—is said to be 'aliased' or 'wrapped'.

In order to resolve depth in ranges larger than $c/(2f)$, depth-resolving machine 48 may compute additional phase images using raw shutters acquired at different modulation frequencies. In some examples three frequencies may be used; in other examples two frequencies are sufficient. The combined input from all of the raw shutters (nine in the case of three frequencies, six in the case of two) is sufficient to uniquely determine each $Z_j$. Redundant depth-imaging of the same subject and image frame to provide a non-periodic depth estimate is called 'de-aliasing' or 'unwrapping'. A depth image may be represented as a numeric array with a radial distance value $Z_j$ provided for each pixel and associated with coordinates $(X, Y)_j$ that specify the pixel position. A depth image derived in this manner may be referred to as a 'radial distance map'. However, other types of depth images (e.g., depth images based on other coordinate systems) are also envisaged. Irrespective of the coordinate system employed, a depth image is another example of a derived digital image derived from plural contributing digital images. In this example, the contributing digital images may include a set of phase images acquired at different modulation frequencies, or, a corresponding set of raw shutters.

Depth-resolving machine 48 may be configured differently for use with other types of 3D digital cameras. In stereo-optical 3D imaging systems, the depth-resolving machine may compute depth based on the horizontal disparity (i.e., lateral offset) between a pixel of one contributing digital image (e.g., a right stereo image) and a corresponding pixel of another contributing digital image (e.g., a left stereo image). In 3D imaging systems employing a structured-light camera, where the contributing digital image exhibits a reflection of structured illumination from the subject, the depth-resolving machine may be configured to compute depth values based on geometric analysis of the reflection, including triangulation of the depth coordinate Z based on the X, Y coordinates of adjacent structure features. In these and other examples, the depth-resolving machine processes one or more contributing digital images to furnish a derived digital image in the form of a depth image. As in the previous example, a depth image may be represented by a numeric array with a depth value $Z_j$ provided for each pixel and associated with coordinates $(X, Y)_j$ that specify the pixel position.

In some implementations, the pixels of a digital image may be classified into one or more segments based on object type. A classification engine comprising downstream classification machine 50D may be configured to enact object-type classification, which may include a single-tier or multi-tier (i.e., hierarchical) classification scheme. In some examples, pixels may be classified as foreground or background. In some examples, a segment of pixels classified as foreground may be further classified as a human or non-human segment. In some examples, pixels classified as human may be classified still further as a 'human head', 'human hand', etc. A classified digital image may be represented as a numeric array with a signal value $S_j$ and class value $C_j$ provided for each pixel and associated with coordinates $(X, Y)_j$ that specify the pixel position. A classified digital image is yet another example of a derived digital image, derived from one or more contributing digital images.

In some video implementations, tracking engine 54 may employ model fitting to track the motion of classified depth-image segments from frame to frame. In examples in which the subject includes a human being, for example, classified segments corresponding to the hands may be segmented from the rest of the subject. The hand segments can then be tracked through the sequence of depth-image frames and/or fit to a kinematic model. Tracked segments may be used as input for virtual-reality video games or as gesture input for controlling a computer, for example. Naturally, this disclosure extends to various other segmentation and tracking tasks that may be performed on the output of a 3D digital camera.

Continuing in FIG. 2, another classification engine comprising upstream classification machine 50U is configured to receive one or more contributing digital images of a subject—raw shutters, phase images, right and left stereo images, and/or any other type of contributing digital image. The upstream classification machine is configured to label any pixel of a contributing digital image that is liable to corrupt a corresponding pixel of any digital image derived from the contributing digital image. The pixels labeled by the upstream classification machine may be those that exhibit one or more problem conditions, including but not limited to the problem conditions noted above: motion of the subject during 3D image acquisition, superposition of light reflected along plural inequivalent paths (as caused by imaging a semitransparent subject, for example), specular reflection, and reflection from a retroreflective surface of the subject, or any combination of the above. These and other problem conditions may propagate to corresponding pixels of one or more derived digital images via the logic of depth-resolving machine 48. In particular, a problem condition in a pixel of a contributing digital image may give rise to an erroneous (i.e., corrupt) depth value or object classification in a corresponding pixel of the derived digital image.

Figure 3:
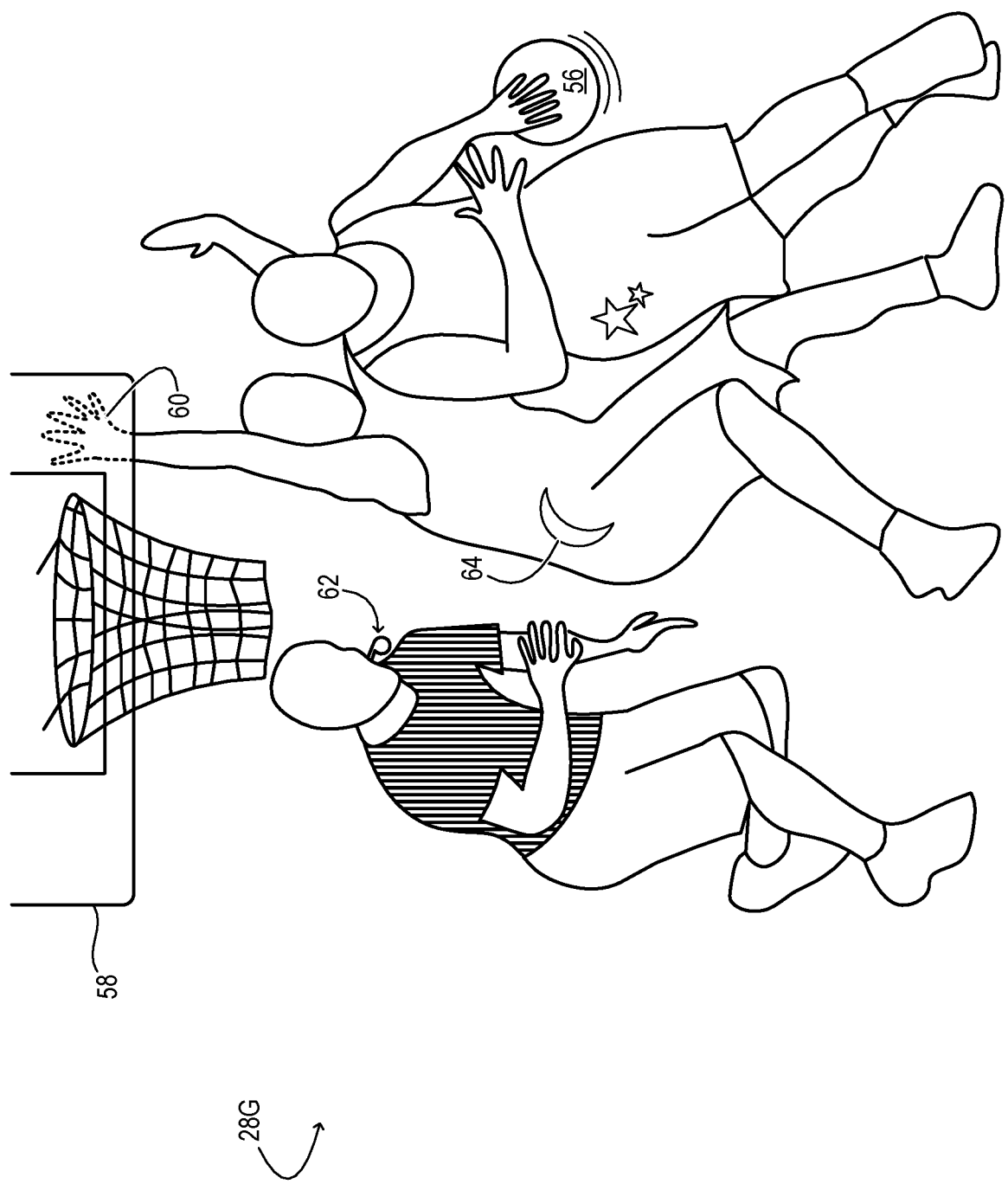
FIG. 3 shows aspects of an example photographic or videographic subject with features that may reduce the fidelity of 3D digital imaging.

For efficiency of description, FIG. 3 shows an example subject 28G that exhibits each of the example problem conditions identified above. Other 3D imaging subjects consonant with this disclosure may exhibit different problem conditions, additional problem conditions, fewer problem conditions, or no problem conditions. Subject 28G includes an object 56 in the form of a basketball, which is moving rapidly on the timescale of 3D image acquisition. Where plural contributing digital images of a subject are acquired in succession (e.g., nine raw shutters for CW-ToF imaging), any locus of a moving subject may map to different pixels in two or more of the contributing digital images. This effect may cause errors in phase-resolution and de-aliasing algorithms, which operate based on the assumption that corresponding pixels of different contributing digital images map to the same subject locus.

Subject 28G also includes a semitransparent surface 58 in the form of a backboard. Each locus of an imaged semitransparent surface may act as an optical beamsplitter, returning a superposition of distinct reflections to the camera. One reflection may be from the semitransparent surface itself; another reflection may be from an object situated behind the semitransparent surface, such as player's hand 60 in subject 28G. When signal from plural distinct reflections is combined in depth-resolving machine 48—as though it originated from the same locus—a noisy or erroneous depth value may result.

Subject 28G also includes a specularly reflective object 62 in the form of a shiny whistle. Generally speaking, a specularly reflective object cannot return active illumination into the finite well depth of the sensor array at acceptably high signal strength. For this reason, at least, a specularly reflective object may defy 3D imaging.

Subject 28G also includes a retroreflective surface 64 in the form of high-visibility retroreflective embroidery on the players' uniforms. A retroreflective surface is problematic for 3D digital imaging because the intensity of retroreflected active illumination may overwhelm the collection and sensor componentry of the camera. Fidelity-reducing effects may include 'blooming' past the edges of the imaged surface, due to signal diffusion among the elements of the sensor array, as well as multipath reflections from the semireflective surfaces inside the camera—reflections that would be negligible but for the unusually high intensity of retroreflected active illumination.

Returning briefly to FIG. 2, upstream classification machine 50U may be configured to classify different pixels of a contributing digital image as exhibiting different problem conditions. For instance, the upstream classification machine may label a first pixel of a contributing digital image as exhibiting a first problem condition liable to corrupt a corresponding first pixel of a derived digital image. The upstream classification machine may also label a second pixel of the contributing digital image as exhibiting an inequivalent second problem condition liable to corrupt a corresponding second pixel of the derived digital image. Here, the first and second problem conditions may each include one of the problem conditions enumerated above. More generally, the upstream classification machine may be configured to label pixels corresponding to any number of inequivalent conditions liable to corrupt a corresponding pixel of a derived digital image.

In some examples, downstream classification machine 50D and upstream classification machine 50U may employ deterministic logic to identify object types and/or problem conditions. In other examples, one or both classification machines may be a trained classification machine employing machine-learning technology. As one nonlimiting example, a trained classification machine may include an artificial neural network, as described herein with reference to FIG. 4.

Figure 4:
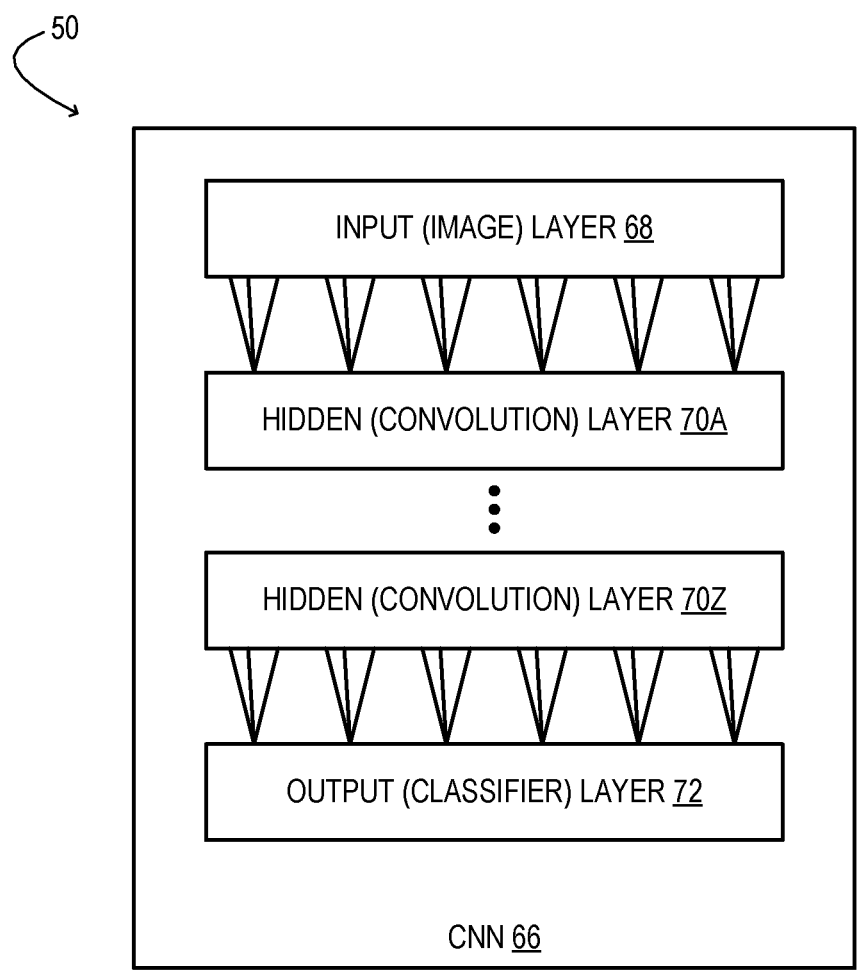
FIG. 4 shows aspects of an example classification machine in the form of a convolutional neural network.

FIG. 4 shows aspects of an example classification machine 50 of image-processing computer 16E. Classification machine 50 is based on a fully convolutional neural network (CNN) 66 having an input layer 68, a series of hidden layers 70, and an output layer 72. Each layer of the CNN includes an array of logic constructs called 'neurons'. Each neuron i of the input layer may correspond to coordinates $(X, Y)_i$ of a contributing digital image provided as input. During operation of the classification machine, each signal value $S_i$ of a contributing digital image is received at the node corresponding to coordinates $(X, Y)_i$ of input layer 68 and is transformed successively through each of the series of hidden layers 70. Each neuron of a hidden layer receives its input from neurons of the layer above, enacts a logic operation on the input, and passes an output to neurons of the layer below. Each neuron of output layer 72 provides a classification label $C_i$ that is attached to coordinates $(X, Y)_i$. In some examples that use an artificial neural network to label pixels of contributing digital images affected by problem conditions, the input layer of the network may be configured to receive one contributing digital image at a time, both in training and in application. In other examples, the input layer may receive related sets of contributing digital images (e.g., a set of three phase images or nine raw shutters).

In contrast to the neurons of a generic neural network, each neuron of CNN 66 receives input only from the neuron directly above it, or from a close neighbor of that neuron. This feature reflects the fact that any classification on coordinates $(X, Y)_i$ of a digital image depends more strongly on information close to $(X, Y)_i$ than on information from distant parts of the digital image.

Among the hidden layers 70 of CNN 66 are one or more convolution, or filter, layers. Each convolution layer enacts a filtering operation by computing a dot product between its vector of inputs and a filter vector of the same dimensions. The elements of each filter vector are adjustable parameters called 'filter weights'. During training of the CNN, the filter weights are optimized in a closed-loop manner, so as to cause the CNN to converge onto known, ground-truth classifications from a set of contributing training images provided as input. More specifically, a global error is computed for classification of the contributing training images based on a trial set of filter weights, by comparing the output versus the ground-truth classifications. Then each filter weight is adjusted so as to reduce the global error in a process known as back propagation. To facilitate back propagation, the filtering and/or other logic function enacted by each neuron may be required to be differentiable with respect to an associated filter weight. In some examples, each neuron may include logic configured to compute its own derivatives. Such derivatives may be used in a parameter optimization procedure, such as the 'steepest descent' method, among others.

CNN 66 may include a large number of filters arranged in hidden layers 70. In contrast to a generic neural network, where the filter vectors of each neuron are optimized independently, the filter vectors in CNN 66 may be constrained to reflect the inherent similarities among the individual sensor elements of a sensor array. Provided that a sufficient quantity of labeled training data is made available during the training phase, a CNN can potentially learn to properly identify an array of problem conditions under diverse conditions. Moreover, CNNs are naturally invariant to translational shifting in the component images at the input layer, providing tolerance to variances and offsets among the various component images (training and operational).

Returning again to FIG. 2, image-processing computer 16E includes one or more repair engines configured to compute appropriate repair values for pixels of a derived digital image that may be corrupted due to problem conditions in a contributing digital image. More specifically, each repair engine 52A-D is configured to compute a repair value for a pixel of a derived digital image corresponding to a pixel of a contributing digital image classified as exhibiting a problem condition. In examples in which the derived digital image is a depth image, the repair value may take the form of a substitute depth value. In examples in which the derived digital image is a di to image classified according to object type, the repair value may take the form of a substitute object-type classification.

Repair engine 52A is invoked when a pixel of a contributing digital image is classified as exhibiting motion of the subject during 3D image acquisition. In some examples, repair engine 52A may compute a repair value for the corresponding pixel of a derived digital image based on a shortened series of contributing digital images—e.g., six consecutive raw shutters spanning two modulation frequencies, as opposed to nine raw shutters spanning three modulation frequencies. By limiting the analysis to contributing digital images spaced closely in time, the extent of subject motion across the sequence of contributing digital images is reduced. In some examples, when a shortened series of contributing digital images is processed to resolve depth, the phase-unwrapping operation may be further informed by depth values of nearby pixels not corrupted due to subject motion.

In other examples, repair engine 52A may compute a repair value for the corresponding pixel of a derived digital image based on optical-flow analysis of the motion of the subject. More specifically, in examples in which a moving object is tracked from frame to frame in a 3D video acquisition, the repair engine may extrapolate an X, Y offset correlating a pixel of an earlier contributing digital image to a pixel of later contributing digital image. The offset may be extrapolated based on the trajectory of the object and on the acquisition times of the earlier and later contributing digital images. A repair value for the affected pixel may then be obtained by co-processing correlated, as opposed to corresponding, pixels across the series of contributing digital images.

Repair engine 52B is invoked when a pixel of a contributing digital image is classified as exhibiting a superposition of light reflected along plural inequivalent paths, such as a pixel mapped to a semitransparent object. In some examples, repair engine 52B computes a repair value by resolving the superposition into two or more single-path reflections. The skilled reader will appreciate, for instance, that three raw shutters acquired at different phase offsets and one modulation frequency is an overdetermined basis for a phase image. Typically, the redundancy in this basis is used in depth-resolving machine 48 to improve the signal-to-noise ratio of the phase image. If it is known, however, that the three raw shutters image a superposition of two distinct reflections of arbitrary intensity, then that basis can be used in closed form to compute the component phase images of the two reflections. Moreover, the various component phase images obtained in this manner may be combined with corresponding component phase images acquired at other modulation frequencies, to achieve de-aliasing and/or downstream object classification. In one example, repair engine 52B may be configured to compute a repair value based on the shallower of the radial distances so obtained, which would correspond to the semitransparent surface (e.g., surface 58 of FIG. 3). Alternatively, the repair engine may be configured to compute a repair value based on the deeper radial distance, which would correspond to an object situated behind a semitransparent surface (e.g, object 60 of FIG. 3).

Repair engine 52C is invoked when a pixel of a contributing digital image is classified as exhibiting specular reflection. Repair engine 52C may compute a repair value for the corresponding pixel of a derived digital image based on other pixels of the contributing digital image. In one example, the repair engine may compute the repair value by interpolating depth across the segment identified as the specularly reflective object. In some examples, the interpolation may be followed by downstream object classification to arrive at an appropriate substitute object type.

Repair engine 52D is invoked when a pixel of a contributing digital image is classified as exhibiting reflection from a retroreflective surface of the subject. In some examples, repair engine 52D may compute a repair value for the corresponding pixel of a derived digital image by mitigating bloom. Bloom can be mitigated, for example, by correcting depth values or other properties of an affected edge of a foreground object with properties extrapolated from portions of the edge that do not exhibit bloom. In these and other examples, the repair engine may compute the repair value as described in the context of repair engine 52B.

Image-processing computer 16E may include other types of repair engines configured for other repair procedures. As noted above, upstream classification machine 50U may be configured to identify any number of problem conditions (by appropriate training, for example, on correspondingly labeled contributing training images); for each problem condition identified, one or more repair engines may be instantiated and tasked with repairing pixels of the derived digital images affected by that problem condition. In other examples, however, classification may be used to identify problem pixels of a contributing digital image irrespective of the particular problem condition exhibited. Such pixels may be labeled, and a more generic repair procedure applied to corresponding pixels of the derived digital image. The more generic repair procedure may include computing repair values based on properties of other (valid) pixels of the contributing digital image. Repair values may include properties (e.g., depth values or object classifications) interpolated or borrowed from nearby valid pixels.

Figure 5:
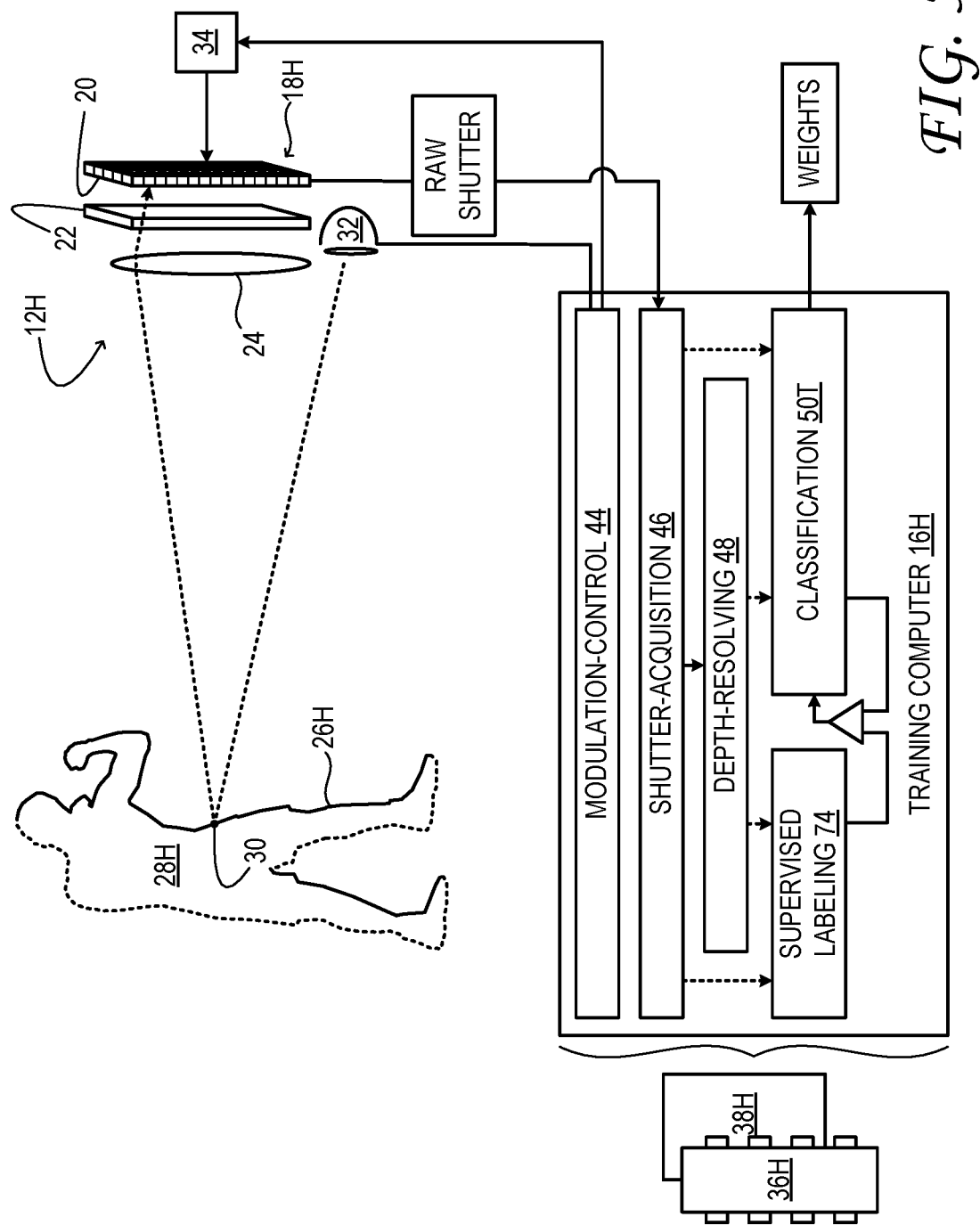
FIG. 5 shows aspects of an example imaging system including a 3D digital camera and training computer.

FIG. 5 shows aspects of a training computer 16H that may be used to facilitate the training of upstream classification machine 50U of image-processing computer 16E, in implementations in which the upstream classification machine is trainable. The training computer is configured to instantiate a trainable classification machine 50T and a supervised labeling engine 74. The training computer is configured to receive a series of contributing training images from training camera 12F and to provide each contributing training image to the trainable classification machine and to the supervised labeling engine.

Figure 6:
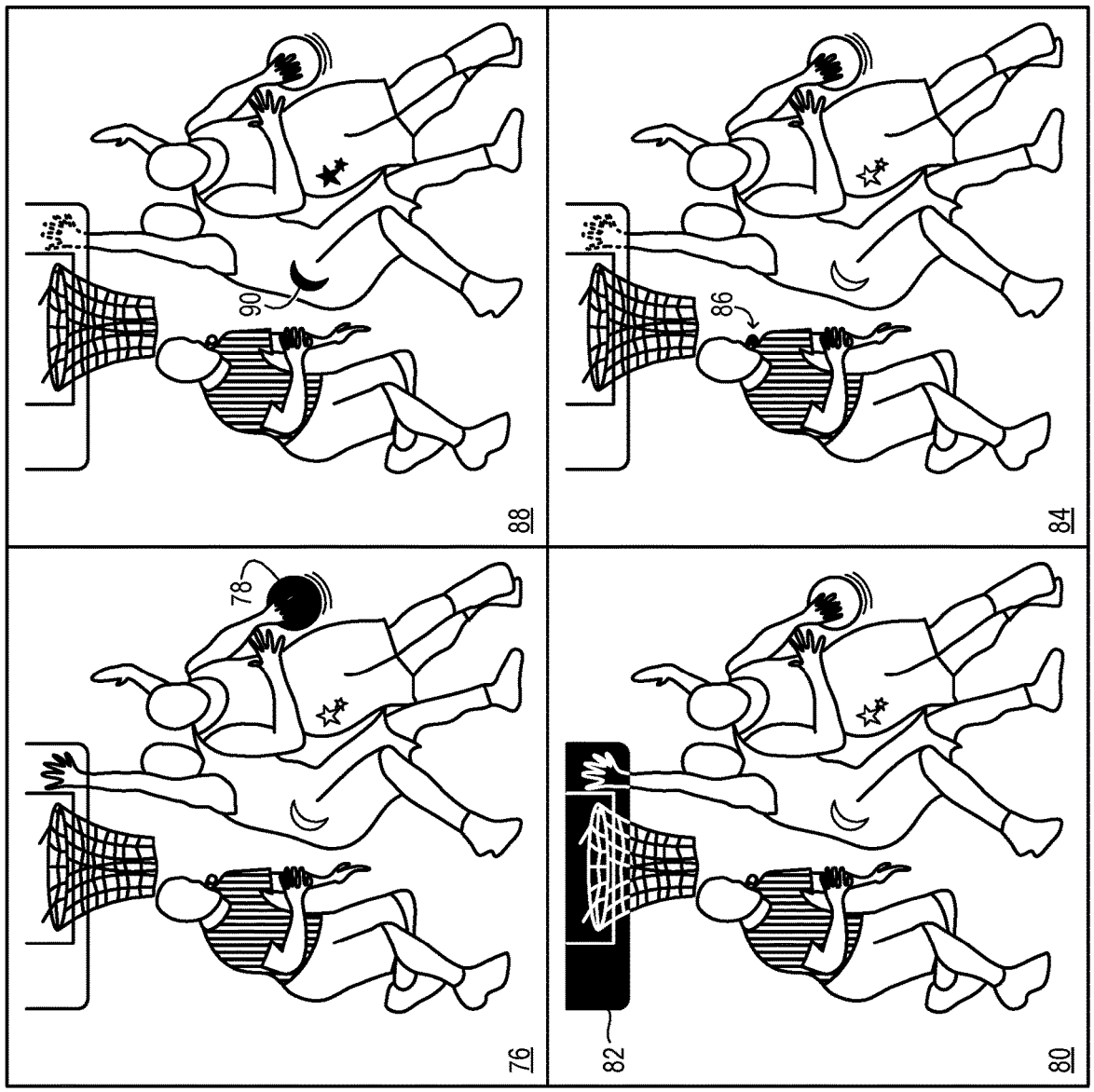
FIG. 6 represents a set of digital images with pixel segments labeled according to conditions that may reduce the fidelity of 3D digital imaging.

Supervised labeling engine 74 may provide a trainer interface that enables a human trainer to view each of the contributing training images and to label any segment of pixels exhibiting one or more of the problem conditions identified above. FIG. 6 shows examples of contributing training images that have been labeled in this manner. Panel 76 shows a labeled contributing training image in which labeled segment 78 corresponds to an object moving rapidly on the timescale of 3D image acquisition. Panel 80 shows a labeled contributing training image in which labeled segment 82 corresponds to a semitransparent surface. Panel 84 shows a labeled contributing training image in which labeled segment 86 corresponds to a specularly reflective object. Panel 88 shows a labeled contributing training image in which labeled segment 90 corresponds to a retroreflective object. In some examples, a contributing training image may include labeled segments corresponding to different problem conditions. The different problem conditions may be labeled distinctly or generally.

Figure 7:
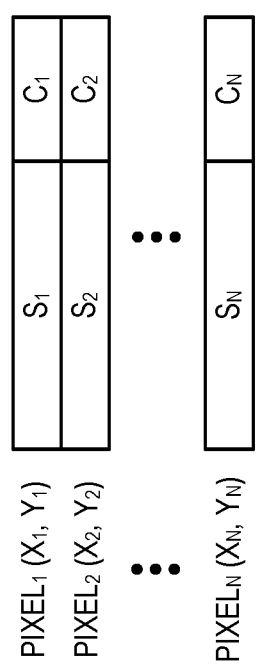
FIG. 7 schematically shows an example data structure that may be used to represent a labeled contributing training image.

FIG. 7 schematically shows an example data structure that may be used to represent a labeled contributing training image. In the illustrated example, each pixel position $(X, Y)_j$ is associated with a signal value $S_j$ and with a class value $C_j$. The class value may be represented by any suitable data type, such as an integer enum, which may take on values corresponding to any of the plurality of problem conditions identified by the upstream classification machine. In some examples, the various problem conditions may be associated with bit values (i.e., powers of two), so that a given pixel may be associated concurrently with two or more problem conditions.

Returning to FIG. 5, supervised labeling engine 74 may also present to the trainer one or more derived digital images based on the contributing training images to be labeled. For example, concurrent presentation of a radial-distance and/or active-brightness map may make it easier for the trainer to identify a problem segment in one or more contributing training images.

In the training approach here described, the output of supervised labeling engine 74 is a set of contributing training images with ground-truth classification labels attached to certain coordinates. Training computer 16H now applies trainable classification machine 50T to the corresponding, unlabeled contributing training images, seeking to reproduce the segmentation found in the labeled contributing training images. To this end, the training computer is configured to compute the global error between the classified output of the trainable classification machine (from output layer 72 of CNN 66) and the vector of ground-truth classification labels from the labeled contributing training images. The training computer is configured to incrementally refine the filter weights via back propagation. At the conclusion of the training process, the refined filter weights are supplied to upstream classification machine 50U of image-processing computer 16E. In this manner, the upstream classification machine is trained to appropriately label the pixels of contributing digital images that are liable to result in invalid depth values and/or object classifications.

Figure 8:
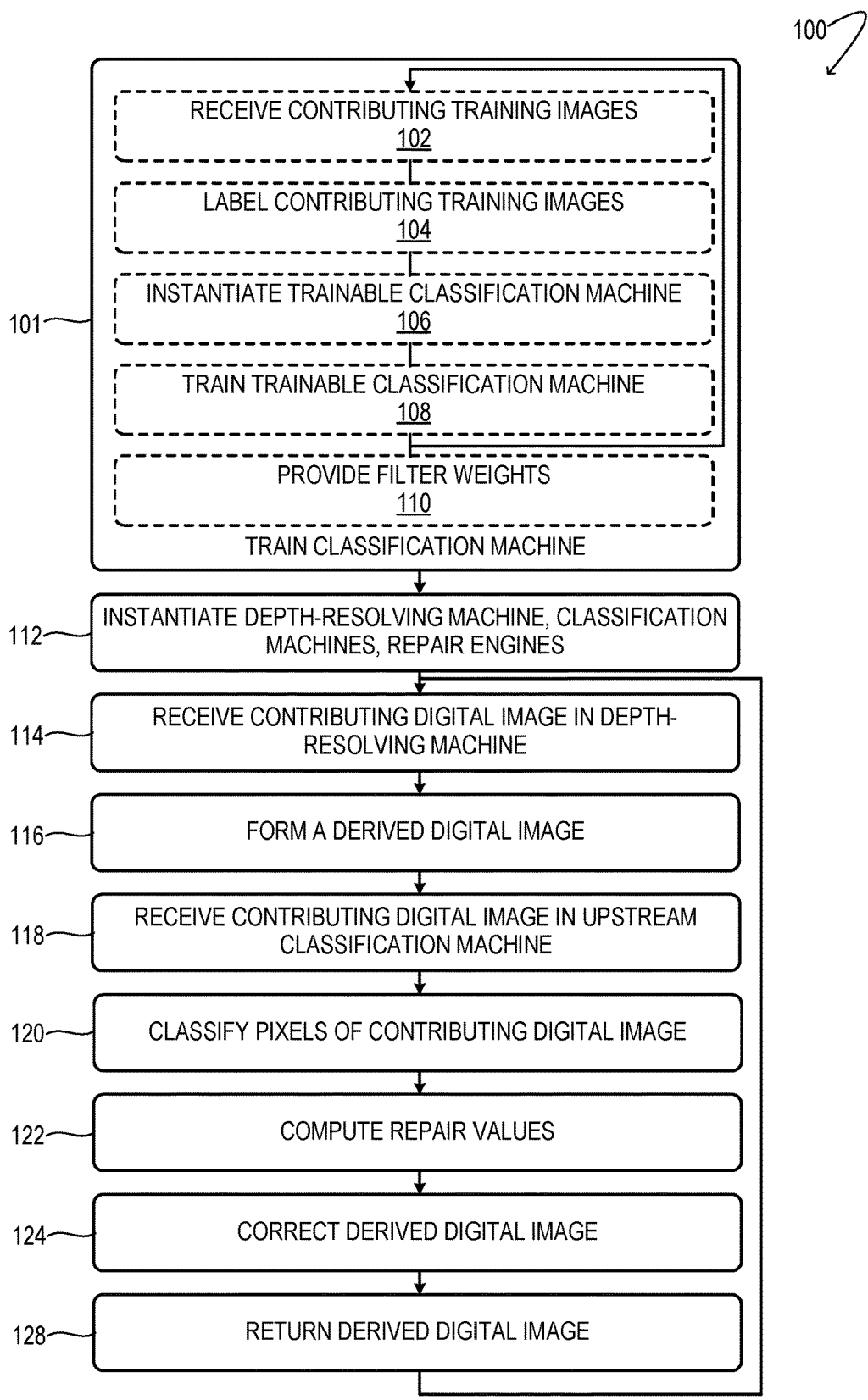
FIG. 8 illustrates aspects of an example method to process a contributing digital image of a subject in an image-processing computer.

FIG. 8 illustrates aspects of an example method 100 to process a contributing digital image of a subject. In examples in which the image-processing computer of the imaging system includes a trainable classification machine, the method may include, at 101, an initial training phase which is enacted before any contributing digital image is received in the image-processing computer.

Steps 102-110 show aspects of an example implementation of the initial training phase. At 102 a series of contributing training images is received in the training computer. Each of the contributing training images may be acquired using a 3D digital camera similar to that of the imaging system, and may be broadly similar to the types of images acquired by the imaging system after training. The contributing training images may include raw shutters, phase images, right or left stereo images, and/or other kinds of digital images.

At 104 one or more classified contributing training images are formed by labeling a respective one or more contributing training images. In each classified contributing training image, pixels exhibiting problem conditions may be labeled accordingly. In some examples, such pixels are labeled by a human trainer via a trainer interface of the training computer. In other examples, the training process may be supervised by a human trainer but enacted automatically, at least in part, according to a suitable heuristic.

At 106 the training computer instantiates a trainable classification machine. At 108 the one or more contributing training images are submitted to the trainable classification machine, and the trainable classification machine is trained to reproduce the classification from the corresponding classified contributing training images. In particular, the trainable classification machine may be trained to classify a first pixel of a contributing digital image as exhibiting a first problem condition, to classify a second pixel of the contributing digital image as exhibiting a second problem condition, and so on. During the training phase, a set of filter weights is refined via back-propagation, annealing, or other machine-learning methods. At 110 the filter weights are provided to upstream classification machines of one or more image-processing computers. More particularly, the filter weights may be provided to any imaging system associated with a 3D imaging camera substantially similar to the camera used to acquire the training images.

Steps 112-128 of method 100 correspond to an application phase. At 112 a depth-resolving machine and one or more classification machines and repair engines are instantiated in an image-processing computer. At 114 a contributing digital image is received in a depth-resolving machine of the image-processing computer. The contributing digital image may be acquired using a 3D digital camera similar to that of the training system, and may be broadly similar to the types of training images acquired by the training system. The contributing training images may include raw shutters, phase images, right or left stereo images, and/or other kinds of digital images. The contributing digital image may be received from a 3D digital camera, as described above. At 116, a derived digital image is formed based on the contributing digital image. The derived digital image may include a depth image or a digital image classified by object type, for example. At 118 the contributing digital image is received in an upstream classification machine. The contributing image may be one of a plurality of contributing digital images of the subject received by the depth-resolving and upstream classification machines during the application phase. At 120 certain pixels of contributing image are classified in the upstream classification machine, as described above.

At 122 a repair value is computed for a pixel of the derived digital image corresponding to any pixel of a contributing digital image labeled by the upstream classification machine. The repair value may be a replacement value for any property of the corresponding pixel, such as a depth value or object classification. The repair value may also represent a residual value that may be used to adjust (e.g., add to or subtract from) the corresponding original depth value, in order to obtain a more accurate depth. In some examples, the repair value may be computed by replacing an affected properly of the corresponding pixel of the derived digital image with a property computed based on other pixels of the derived digital image that are indicated to be valid. In some examples, repair values for corresponding pixels of a derived digital image may be computed via one or more repair engines each configured to effect a particular kind of repair responsive to a particular problem condition. For instance, a first repair engine may be used to compute a repair value for a corresponding first pixel of a derived digital image, and a second repair engine may be used to compute a repair value for a corresponding second pixel of the derived digital image.

At 124 a derived digital image is corrected based on the repair value as computed above. Overall correction of the derived digital image may include replacement of any number of potentially corrupt corresponding pixels of the derived digital image. In examples in which the derived digital image includes a classified digital image (e.g., a classified active-brightness map or other), the act of correcting the derived digital image may include replacing the object classification of the corresponding pixel of the depth image by the repair value. In examples in which the derived digital image includes a depth image, the act of correcting the derived digital image may include replacing the depth value of the corresponding pixel of the depth image by the repair value. In more particular examples in which downstream object-type classification is desired, the corrected derived digital image including the appropriate repair values may be provided to a downstream object-type classification machine. At 128 the corrected derived digital image is returned as input to the application or OS that requested the 3D imaging.

Figure 9:
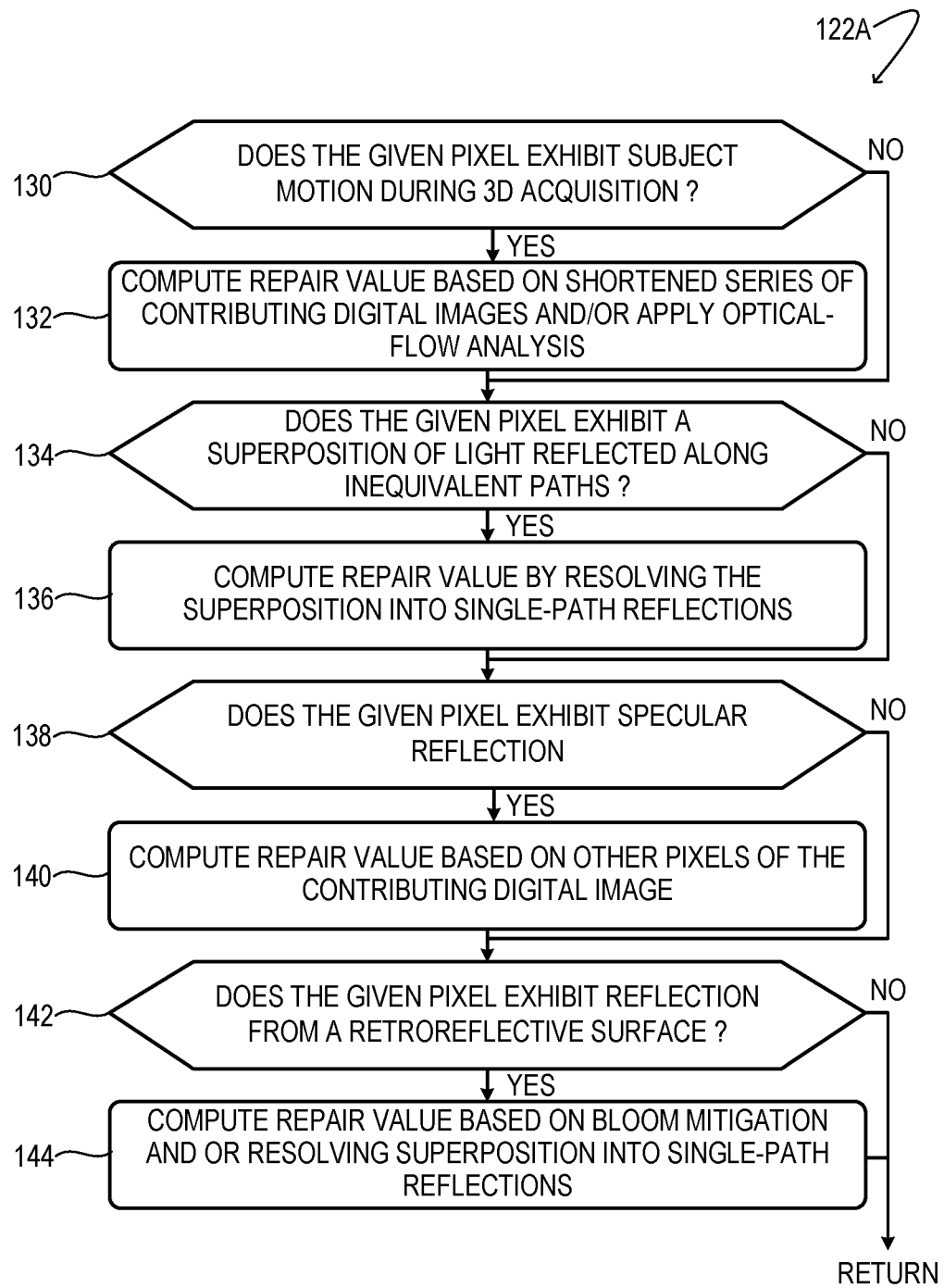
FIG. 9 illustrates aspects of an example method to compute a repair value for a pixel of a derived digital image that may be corrupted.

FIG. 9 illustrates an example method 122A to repair a pixel of a derived digital image pursuant to detection of a problem condition in a corresponding pixel of a contributing digital image. Method 122A may be enacted as a particular instance of step 122 of method 100.

At 130 of method 122A it is determined whether a given pixel of a contributing digital image exhibits motion of the subject during 3D image acquisition. If the pixel exhibits motion then, at 132, a repair value is computed. The repair value may be computed, for example, based on a shortened series of contributing digital images and/or optical-flow analysis of the motion of the subject. At 134 it is determined whether the pixel exhibits superposition of light reflected along plural inequivalent paths. If the pixel exhibits superposition of light reflected along plural inequivalent paths then, at 136, a repair value is computed. The repair value may be computed, for example, based on resolving the superposition into two or more single-path reflections. At 138 it is determined whether the pixel exhibits a specular reflection. If the pixel exhibits a specular reflection, then, at 140, a repair value is computed. The repair value may be computed, for example, based on other pixels of the contributing digital image. At 142 it is determined whether the pixel exhibits a reflection from a retroreflective surface of the subject. If the pixel exhibits reflection from a retroreflective surface of the subject, then, at 144, a repair value is computed. The repair value may be computed, for example, based on bloom mitigation and/or resolving a superposition of light reflected along plural inequivalent paths into two or more single-path reflections.

No aspect of this disclosure should be understood in a limiting sense, because numerous variations, extensions, and omissions are also envisaged. For instance, although object-type classification is presented above as an example application for 3D digital imaging, the methods herein are equally appropriate in other application contexts, including, e.g., 3D surface reconstruction. Although upstream and downstream classification is enacted in separate machines in the above description, these functions may instead be combined and enacted using the same classification machine. Although the above description primarily addresses four types of problem conditions that adversely affect 3D imaging, the disclosed classification and repair approach is in no way limited to those four. Additional problem conditions that may be identified and labeled in a contributing digital image include contamination by bright ambient light, insufficient active brightness, multi-path reflections, calibration error, and/or 'flying pixels', among others. In some implementations, the classification-and-repair approach presented herein may be further extended to include spatial smoothing, edge boundary detection, and sharpening. In these and other implementations, suitable repair may be used to facilitate alignment of a depth image to a corresponding color (i.e., RGB image) of the same subject.

The methods and processes described herein may be tied to a computing system of one or more computing devices. Such methods and processes may be implemented as an application program or service, an application programming interface (API), a library, and/or other computer-program product.

Referring again to FIG. 2, a schematic representation of a computing system 16 is shown in the form of image-processing computer 16E, which may be configured to provide any to all of the computer functionality disclosed herein. Computing system 16 may take the form of at least one personal computer, workstation, network-accessible server computer, tablet computer, mobile communication device (e.g., smart phone), and/or other computing device.

Computing system 16 includes a logic system 36 and a memory system 38. Computing system 16 may optionally include a display system, an input system, a communication system, and/or other systems not shown in FIG. 2.

Logic system 36 includes one or more physical devices configured to execute instructions. For example, the logic system may be configured to execute instructions that are part of at least one operating system (OS), application, service, and/or other program construct. The logic system may include at least one hardware processor (e.g., microprocessor, central processor, central processing unit (CPU) and/or graphics processing unit (GPU)) configured to execute software instructions. Additionally or alternatively, the logic system may include at least one hardware or firmware device configured to execute hardware or firmware instructions. A processor of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing. Aspects of the logic system may be virtualized and executed by remotely-accessible, networked computing devices configured in a cloud-computing configuration.

Memory system 38 includes at least one physical device configured to temporarily and/or permanently hold computer information, such as data and instructions executable by logic system 36. When the memory system includes two or more devices, the devices may be collocated or remotely located. Memory system 38 may include at least one volatile, nonvolatile, dynamic, static, read/write, read-only, random-access, sequential-access, location-addressable, file-addressable, and/or content-addressable computer-memory device. Memory system 38 may include at least one removable and/or built-in computer-memory device. When the logic system executes instructions, the state of memory system 38 may be transformed—e.g., to hold different data.

Aspects of logic system 36 and memory system 38 may be integrated together into one or more hardware-logic components. Any such hardware-logic component may include at least one program- or application-specific integrated circuit (PASIC ASIC), program- or application-specific standard product (PSSP/ASSP), system-on-a-chip (SOC), or complex programmable logic device (CPLD), for example.

Logic system 36 and memory system 38 may cooperate to instantiate one or more logic machines or engines. As used herein, the terms 'machine' and 'engine' each refer collectively to a combination of cooperating hardware, firmware, software, instructions, and/or any other components that provide computer functionality. In other words, machines and engines are never abstract ideas and always have a tangible form. A machine or engine may be instantiated by a single computing device, or a machine or engine may include two or more subcomponents instantiated by two or more different computing devices. In some implementations, a machine or engine includes a local component (e.g., a software application executed by a computer processor) cooperating with a remote component (e.g., a cloud computing service provided by a network of one or more server computers). The software and/or other instructions that give a particular machine or engine its functionality may optionally be saved as one or more unexecuted modules on one or more computer-memory devices.

Machines and engines may be implemented using any suitable combination of machine learning (ML) and artificial intelligence (AI) techniques. Non-limiting examples of techniques that may be incorporated in an implementation of one or snore machines include support vector machines, multilayer neural networks, convolutional neural networks (e.g., spatial convolutional networks for processing images and/or video, and/or any other suitable convolutional neural network configured to convolve and pool features across one or more temporal and/or spatial dimensions), recurrent neural networks (e.g., long short-term memory networks), associative memories (e.g., lookup tables, hash tables, bloom filters, neural Turing machines and/or neural random-access memory) unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases)). When a machine is trained for a classification task using images of human training subjects, the images may derived from a diverse population of training subjects, in order to avoid bias in any trained machine.

When included, a display system may be used to present a visual representation of data held by memory system 38. The visual representation may take the form of a graphical user interface (GUI) in some examples. The display system may include one or more display devices utilizing virtually any type of technology. In some implementations, display system may include one or more virtual-, augmented-, or mixed reality displays.

When included, an input system may comprise or interface with one or more input devices. An input device may include a sensor device or a user input device. Examples of user input devices include a keyboard, mouse, or touch screen.

When included, a communication system may be configured to communicatively couple computing system 16 with one or more other computing systems. The communication system may include wired and/or wireless communication devices compatible with one or more different communication protocols. The communication system may be configured for communication via personal-, local- and/or wide-area networks.

To further summarize, one aspect of this disclosure is directed to a method to process a contributing digital image of a subject. Enacted in an image-processing computer, the method comprises: receiving the contributing digital image in a depth-resolving machine configured to furnish a depth image based at least in part on the contributing digital image; receiving the contributing digital image in a classification machine previously trained to classify a pixel of the contributing digital image as liable to corrupt a depth value of a corresponding pixel of the depth image furnished via the depth-resolving machine; computing a repair value for the depth value of the corresponding pixel of the depth image; correcting the depth image based on the repair value; and returning the depth image as corrected.

In some implementations, the classification machine includes an artificial neural network. In some implementations, the contributing digital image is one of a plurality of contributing digital images of the subject received in the depth-resolving machine and in the classification machine. In some implementations, correcting the depth image includes replacing the depth value of the corresponding pixel of the depth image by the repair value. In some implementations, the contributing digital image includes a raw shutter or phase image from a time-of-flight (ToF) camera, and the depth-resolving machine is configured to furnish the depth it rage by ToF analysis. In some implementations, the depth-resolving machine is configured to compute the depth value based on a disparity between the pixel of the contributing digital image and a corresponding pixel of another contributing digital image. In some implementations, the contributing digital image exhibits a reflection of a structured illumination of the subject, and the depth-resolving machine is configured to compute the depth value based on geometric analysis of the reflection.

Another aspect of this disclosure is directed to an image-processing computer comprising a logic system and a computer-memory system operatively coupled to the logic system. The computer-memory system holds instructions that cause the logic system to: instantiate a depth-resolving machine configured to furnish a derived digital image of a subject based on a contributing digital image of the subject; instantiate a classification machine trained to classify a pixel of the contributing digital image as liable to corrupt a corresponding pixel of the derived digital image; receive the contributing digital image in the depth-resolving machine; receive the contributing digital image in the classification machine; compute a repair value for the corresponding pixel of the derived digital image; correct the derived digital image based on the repair value; and return the derived digital image as corrected.

In some implementations, the classification machine includes an artificial neural network. In some implementations, the contributing digital image is one of a plurality of contributing digital images of the subject received in the depth-resolving machine and in the classification machine. In some implementations, the repair value includes a property computed based on another pixel of the derived digital image. In some implementations, the classification machine is an upstream classification machine, and the instructions cause the logic system to instantiate a downstream classification machine configured to classify one or more pixels of the derived digital image according to object type. In some implementations, the derived digital image is corrected by replacing an object-type classification of the corresponding pixel of the derived digital image.

Another aspect of this disclosure is directed to a method to process a contributing digital image of a subject. Enacted in an image-processing computer, the method comprises: receiving the contributing digital image in a depth-resolving machine configured to furnish a derived digital image of the subject based on the contributing digital image; receiving the contributing digital image in a classification machine configured to classify a first pixel of the contributing digital image as exhibiting a first condition liable to corrupt a corresponding first pixel of the derived digital image; computing, via a first repair engine configured to repair pixels classified as exhibiting the first condition, a repair value for the corresponding first pixel of the derived digital image; correcting the derived digital image based on the repair value computed for the corresponding first pixel of the derived digital image; and returning the derived digital image as corrected.

In some implementations, the first condition includes motion of the subject, and the repair value for the corresponding first pixel is computed based on one or both of a shortened series of contributing digital images and optical-flow analysis of the motion of the subject. In some implementations, the first condition includes a superposition of light reflected along two or more inequivalent paths, and computing the repair value for the corresponding first pixel includes resolving the superposition into two or more single-path reflections. In some implementations, the first condition includes a specular reflection, and the repair value for the corresponding first pixel is computed based on a property of another pixel of the contributing digital image. In some implementations, the first condition includes reflection from a retroreflective surface of the subject, and computing the repair value for the corresponding first pixel includes one or both of bloom mitigation and resolving a superposition of light reflected along two or more inequivalent paths into two or more single-path reflections. In some implementations, the classification machine is further configured to classify a second pixel of the contributing digital image as exhibiting a second condition liable to corrupt a corresponding second pixel of the derived digital image, the method further comprising: computing, via a second repair engine configured to repair pixels classified as exhibiting the second condition, a repair value for the corresponding second pixel of the derived digital image. In some implementations, the method further comprises, during a training phase enacted prior to receiving the contributing digital image of the subject in the classification machine: training the classification machine to classify the first pixel of the contributing digital image as exhibiting the first condition; and training the classification machine to classify the second pixel of the contributing digital image as exhibiting the second condition.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and r properties disclosed herein, as well as any and all equivalents thereof.

The invention claimed is:

1. Enacted in an image-processing computer, a method to process a contributing digital image of a subject, the method comprising:
   receiving the contributing digital image in a depth-resolving machine, the depth-resolving machine being configured to furnish a depth image based at least in part on the contributing digital image;
   receiving the contributing digital image in a classification machine previously trained to classify a pixel of the contributing digital image as having a condition liable to corrupt a depth value of a corresponding pixel of the depth image furnished via the depth-resolving machine, the condition including one or more of subject motion, specular reflection, reflection from a retroreflective surface of the subject, and superposition of light reflected along two or more inequivalent paths, wherein the classification machine comprises an artificial neural network having an output layer comprising a classification layer;
   computing, based on the condition, a repair value for the depth value of the corresponding pixel of the depth image;
   correcting the depth image based on the repair value; and
   returning the depth image as corrected.

2. The method of claim 1 wherein the classification machine is trained using ground-truth training data with labeled pixels that exhibit the condition.

3. The method of claim 1 wherein the contributing digital image is one of a plurality of contributing digital images of the subject received in the depth-resolving machine and in the classification machine.

4. The method of claim 1 wherein correcting the depth image includes replacing the depth value of the corresponding pixel of the depth image by the repair value.

5. The method of claim 1 wherein the contributing digital image includes a raw shutter or phase image from a time-of-flight (ToF) camera, and wherein the depth-resolving machine is configured to furnish the depth image by ToF analysis.

6. The method of claim 1 wherein the depth-resolving machine is configured to compute the depth value based on a disparity between the pixel of the contributing digital image and a corresponding pixel of another contributing digital image.

7. The method of claim 1 wherein the contributing digital image exhibits a reflection of a structured illumination of the subject, and wherein the depth-resolving machine is configured to compute the depth value based on geometric analysis of the reflection.

8. The method of claim 1 wherein the condition includes the reflection from a retroreflective surface of the subject, and wherein computing the repair value for the corresponding pixel includes one or both of bloom mitigation and resolving a superposition of light reflected along two or more inequivalent paths into two or more single-path reflections.

9. The method of claim 1 wherein the condition includes the superposition of light reflected along two or more inequivalent paths, and wherein computing the repair value for the corresponding pixel includes resolving the superposition into two or more single-path reflections.

10. An image-processing computer comprising:
   a logic system; and
   operatively coupled to the logic system, a computer-memory system holding instructions that cause the logic system to:

instantiate a depth-resolving machine configured to furnish a derived digital image of a subject based on a contributing digital image of the subject;

instantiate a classification machine trained to classify a pixel of the contributing digital image as having a condition liable to corrupt a corresponding pixel of the derived digital image, the condition including one or more of subject motion, specular reflection, reflection from a retroreflective surface of the subject, and superposition of light reflected along two or more inequivalent paths, wherein the classification machine comprises an artificial neural network having an output layer comprising a classification layer and is trained using ground-truth training data with labeled pixels that exhibit the condition;

receive the contributing digital image in the depth-resolving machine;

receive the contributing digital image in the classification machine;

compute, based on the condition, a repair value for the corresponding pixel of the derived digital image;

correct the derived digital image based on the repair value; and return the derived digital image as corrected.

11. The image-processing computer of claim 10 wherein the contributing digital image is one of a plurality of contributing digital images of the subject received in the depth-resolving machine and in the classification machine.

12. The image-processing computer of claim 10 wherein the repair value includes a property computed based on another pixel of the derived digital image.

13. The image-processing computer of claim 10 wherein the classification machine is an upstream classification machine, and wherein the instructions cause the logic system to instantiate a downstream classification machine configured to classify one or more pixels of the derived digital image according to object type.

14. The image-processing computer of claim 13 wherein the derived digital image is corrected by replacing an object-type classification of the corresponding pixel of the derived digital image.

15. Enacted in an image-processing computer, a method to process a contributing digital image of a subject, the method comprising:

receiving the contributing digital image in a depth-resolving machine configured to furnish a derived digital image of the subject based on the contributing digital image;

receiving the contributing digital image in a classification machine configured to classify a first pixel of the contributing digital image as exhibiting a first condition liable to corrupt a corresponding first pixel of the derived digital image;

computing, based on the first condition and via a first repair engine configured to repair pixels classified as exhibiting the first condition, a repair value for the corresponding first pixel of the derived digital image, wherein the first condition includes a specular reflection, and wherein the repair value for the corresponding first pixel is computed based on a property of another pixel of the contributing digital image;

correcting the derived digital image based on the repair value computed for the corresponding first pixel of the derived digital image; and returning the derived digital image as corrected.

16. The method of claim 15 wherein the classification machine is further configured to classify a second pixel of the contributing digital image as exhibiting a second condition liable to corrupt a corresponding second pixel of the derived digital image, the method further comprising:

computing, via a second repair engine configured to repair pixels classified as exhibiting the second condition, a repair value for the corresponding second pixel of the derived digital image.

17. The method of claim 16 wherein the second condition includes motion of the subject, and wherein the repair value for the corresponding second pixel is computed based on one or both of a shortened series of contributing digital images and optical-flow analysis of the motion of the subject.

18. The method of claim 16 wherein the second condition includes a superposition of light reflected along two or more inequivalent paths, and wherein computing the repair value for the corresponding second pixel includes resolving the superposition into two or more single-path reflections.

19. The method of claim 16 wherein the second condition includes reflection from a retroreflective surface of the subject, and wherein computing the repair value for the corresponding second pixel includes one or both of bloom mitigation and resolving a superposition of light reflected along two or more inequivalent paths into two or more single-path reflections.

20. The method of claim 16 further comprising, during a training phase enacted prior to receiving the contributing digital image of the subject in the classification machine:

training the classification machine to classify the first pixel of the contributing digital image as exhibiting the first condition; and training the classification machine to classify the second pixel of the contributing digital image as exhibiting the second condition.

* * * * *